United States Patent Office 2,727,076
Patented Dec. 13, 1955

2,727,076

MANUFACTURE OF CARBON TETRACHLORIDE

Glenn W. Warren, Midland, Mich., assignor to The Dow Chemical Company, Midland, Mich., a corporation of Delaware No Drawing. Original application January 22, 1945, Serial No. 574,035. Divided and this application May 2, 1951, Serial No. 224,259

3 Claims. (Cl. 260—658)

This invention concerns an improved method for the chlorination of aliphatic compounds having the general formula:

$$C_nHX_{n'}Y_{n''}$$

wherein X and Y each represents hydrogen or chlorine, $n$ is an integer of from 2 to 3, inclusive, and $n'$ and $n''$ are integers having a sum corresponding to one of the values $2n-1$ and $2n+1$, which improved method permits ready control of the chlorination reaction so as to produce carbon tetrachloride in good yield while at the same time suppressing formation of tetrachloroethylene and avoiding excessive formation of by-products such as partially chlorinated hydrocarbons, hexachloroethane, and particularly hexachlorobenzene.

It is known that mixtures of carbon tetrachloride and tetrachloroethylene may be formed, together with other products such as hexachloroethane, hexachlorobenzene and, frequently, incompletely chlorinated hydrocarbons by reacting an aliphatic compound such as ethylene chloride, propylene chloride, or propane, etc., with sufficient chlorine for complete chlorination of the same, the reaction being carried out in the presence of agents such as fused metal chlorides or porous granular solids, e. g. coke, charcoal, or pumice, etc., which agents have been indicated to be catalysts for the perchlorination reaction. The equations heretofore given for the reactions to form tetrachloroethylene by the perchlorination of the respective compounds, ethylene chloride, propylene chloride and propane are:

(1) $C_2H_4Cl_2 + 3Cl_2 \rightarrow C_2Cl_4 + 4HCl$
(2) $C_3H_6Cl_2 + 6Cl_2 \rightarrow C_2Cl_4 + CCl_4 + 6HCl$
(3) $C_3H_8 + 8Cl_2 \rightarrow C_2Cl_4 + CCl_4 + 8HCl$ Because of the by-products which are formed in large amount in such known perchlorination processes, the yield of perchloroethylene, based on the carbon content of the compound subjected to chlorination, is undesirably low. Also, separation of the tetrachloroethylene is troublesome because of the considerable amount of hexachlorobenzene which is normally present in the mixture of organic products. During fractional distillation of the products, the hexachlorobenzene tends to separate in solid form and accumulate in the distilling system. It thereby reduces the efficiency of the distillation and frequently causes plugging of the vapor-cooling unit. Periodic shutdowns in order to remove the solid deposits of hexachlorobenzene have been necessary.

This application is a division of my copending application, Serial No. 574,035, filed January 22, 1945, now Patent No. 2,577,388, which is, in turn, a continuation-in-part of another application, Serial No. 512,605, filed December 2, 1943, now abandoned. In the application, Serial No. 512,605, I have shown that in the perchlorination of propylene chloride the introduction of carbon tetrachloride, together with the chlorine and propylene chloride ordinarily employed as starting materials, has an effect of suppressing the formation of carbon tetrachloride and of increasing greatly the yield of tetrachloroethylene. It will be noted that this result is contrary to what would be expected on a basis of the above Equation 2, i. e. if the equation were considered as representing a non-reversible reaction, the introduction of a reaction product should not influence the relative rates of formation of the several products and, if the equation were considered as representing a reversible reaction, the introduction in the feed mixture of either product should, according to the law of mass action, suppress the formation of all of the products. It appears that the Equation 2, heretofore believed to represent the reaction, merely expresses the results obtained in past practice and that the perchlorination system probably involves a multiplicity of concurrent reactions with an as yet unknown condition of equilibrium between two or more of the reactions.

In the said application, Serial No. 512,605, it is also disclosed that the so-called "catalysts" heretofore employed in the perchlorination reaction are not required and that propylene chloride may advantageously be perchlorinated to produce tetrachloroethylene by passing a vapor mixture of the same together with chlorine and carbon tetrachloride through an open reaction chamber within which the mixture is ignited, i. e. heated to a reaction temperature. The perchlorination reaction is highly exothermic so that once started it may be continued without external heating.

In my copending application, Serial No. 574,035, it is taught that the method of making tetrachloroethylene by perchlorinating propylene chloride in the presence of initially added carbon tetrachloride, as taught in my application, Serial No. 512,605, is directly applicable with regard to the perchlorination of any aliphatic compound having the general formula, $C_nHX_{n'}Y_{n''}$ wherein the symbols X, Y, $n$, $n'$ and $n''$ have the meanings hereinbefore given and that in all such instances the yield of tetrachloroethylene may be improved by introducing carbon tetrachloride in the feed mixture. In said application, Serial No. 574,035, it is further taught that by introducing tetrachloroethylene, instead of carbon tetrachloride, together with the chlorine and the aliphatic compound to be perchlorinated, the normal formation of tetrachloroethylene may be suppressed and the yield of carbon tetrachloride may be increased over that which is obtained without the introduction of tetrachloroethylene in the feed mixture. Since both of the carbon chlorides just mentioned, i. e. carbon tetrachloride and tetrachloroethylene, are normal products of the perchlorination reaction, it is sufficient, for the production of tetrachloroethylene, that carbon tetrachloride be recycled in the process; or, for the production of carbon tetrachloride, that the tetrachloroethylene be recycled. However, the claims of said application, Serial No. 574,035, are limited to a process wherein carbon tetrachloride is included in the feed mixture to the perchlorination reaction and tetrachloroethylene is produced as a principal product.

The invention of the present application is based on the teachings in my above-discussed applications, Serial Nos. 512,605 and 574,035, but is limited to a process wherein the perchlorination of one or more aliphatic compounds, having the aforementioned general formula, $C_nHX_{n'}Y_{n''}$, is carried out in vapor phase at temperatures of about 500° C. or above, e. g. from 500° to 900° C. and preferably from 500° to 800° C., with tetrachloroethylene in the feed mixture to the reaction, so as to obtain carbon tetrachloride as a principal product.

The tetrachloroethylene which is introduced in the feed mixture of the present invention serves as a diluent and a heat absorbent and aids materially in control of the reaction temperature. Other gaseous or vaporized diluents such as hydrogen chloride or hexachloroethane may be employed to aid in control of the temperature. The temperature control action of the diluent may be supplemented by external cooling or heating of the reaction mixture as necessary in order to maintain a desired reaction temperature.

I have further found that the amount of hexachlorobenzene formed in the reaction varies with changes in the reaction temperature and the proportion of chlorine employed in the feed mixture. In general, a rise in the reaction temperature causes an increase in the formation of hexachlorobenzene. On the other hand, an increase in the proportion of chlorine over that theoretically required to convert the organic starting materials to the desired carbon chloride product tends to suppress the formation of hexachlorobenzene and to increase the formation of carbon tetrachloride.

There is another factor that appears to influence the formation of hexachlorobenzene. The perchlorination reaction is of the "flame" type in the sense that it is a highly exothermic reaction which tends to occur in a fairly well defined zone that is hotter than the surrounding zones and is somewhat analogous to a flame. The analogy just drawn is not intended to imply that light need be emitted by the reaction. Just as a portion of the feed to an ordinary gas flame may sometimes flow around, rather than into, the flame and thus be imperfectly consumed, a portion of the vapor feed to the perchlorination reaction may sometimes tend to flow around, rather than through, the zone of principal reaction, i. e. the reaction "flame," and be incompletely chlorinated. This usually results in an increase in the formation of hexachlorobenzene and sometimes also results in the production of partially chlorinated hydrocarbons. By observing usual precautions, e. g. in the construction and operation of the reactor, so as to direct the inflowing vapors as completely as possible into the reaction flame, the formation of hexachlorobenzene may be curtailed.

The amount of hexachlorobenzene formed is dependent upon a condition of balance between the several factors just mentioned. For instance, by operating so as to direct nearly all of the gas into the reaction flame and by using an excess of chlorine in the feed mixture the reaction may be carried out at high temperatures, e. g. from 700° to 900° C. or higher, without forming hexachlorobenzene in an excessive amount such as to cause plugging of the distilling system during separation of the products, or by employing a lower reaction temperature and directing the vapor feed into the reaction flame the formation of hexachlorobenzene may be restricted without using an excess of chlorine.

As indicated above, the feed mixture employed in the process comprises chlorine, an aliphatic compound having the aforementioned general formula, $C_nHX_{n'}Y_{n''}$, and tetrachloroethylene. The tetrachloroethylene introduced in the feed mixture may be employed in any proportion, but its action in suppressing further formation of the same and in enhancing the yield of carbon tetrachloride is dependent in part on the proportion in which it is used. Under otherwise similar conditions, an increase in the proportion of tetrachloroethylene in the feed mixture from 0.1 molecular equivalent to between 1 and 3 molecular equivalents thereof per mole of the aliphatic compound to be perchlorinated results in a marked increase in the yield of carbon tetrachloride. The minimum proportion of tetrachloroethylene in the feed mixture required in order to obtain a maximum yield of carbon tetrachloride varies somewhat, depending upon the identity of the aliphatic compound being perchlorinated, the proportion of chlorine in the feed mixture, and the reaction temperature, etc., but is usually in the order of between 1 and 3 molecular equivalents of the initially added tetrachloroethylene per mole of the aliphatic compound subjected to perchlorination. A further increase in the proportion of tetrachloroethylene in the feed mixture usually results in little, if any, further increase in the yield of carbon tetrachloride. A large increase in the proportion of tetrachloroethylene in the feed mixture over the minimum amount required to obtain the optimum yield, of carbon tetrachloride sometimes causes a lowering of the yield, below the maximum obtainable, unless the heat is supplied from an outside source in order to maintain a sufficiently high reaction temperature, e. g. a temperature of 400° C. or higher and preferably above 500° C. Such decrease in yield of carbon tetrachloride and accompanying increase in yield of tetrachloroethylene, which sometimes results from a large increase in the proportion of tetrachloroethylene in the feed above the ratio of from 1 to 3 molecular equivalents thereof per mole of the aliphatic compound to be perchlorinated is attributed to the absorption of heat by the excess of tetrachloroethylene in the feed mixture and a resultant lowering of the reaction temperature. In practice, between 0.4 and 10, preferably between 0.5 and 3, molecular equivalents of tetrachloroethylene is employed in the feed mixture per mole of the aliphatic compound to be perchlorinated but larger proportions, e. g. 15 molecular equivalents or more of the initially added tetrachloroethylene per mole of the aliphatic compound to be perchlorinated, may be employed when provision is made for maintaining an adequate reaction temperature.

The chlorine, including that chemically combined in the starting materials, is employed in amount at least as great as that theoretically required for complete conversion of the carbon content of the vaporized starting materials to carbon tetrachloride. It will be noted that the minimum proportion of chlorine just stated includes that chemically combined in the starting materials, e. g. it includes the chlorine content of the tetrachloroethylene and any chlorinated hydrocarbons in the feed mixture, and that the proportion of free chlorine may in some instances be less than would theoretically be required for complete conversion to carbon tetrachloride of the aliphatic compound which is to be perchlorinated. In practice, free chlorine is employed in amount corresponding to at least half of that theoretically required for conversion of the compound to be chlorinated into carbon tetrachloride.

The chlorine, including that chemically combined in the starting materials, is preferably employed in excess over the minimum proportion just stated, since the employment of excess chlorine aids in suppressing the formation of hexachlorobenzene. Usually the excess of chlorine over the above-stated minimum proportion corresponds to between 1 and 5 moles of free chlorine per mole of the aliphatic compound subjected to perchlorination. The chlorine may be used in far greater excess, e. g. as much as 12 moles of chlorine per mole of propylene chloride may be used in perchlorinating the latter.

Examples of aliphatic compounds having the aforementioned general formula, $C_nHX_{n'}Y_{n''}$, which may be perchlorinated by the present method are ethylene, ethane, ethyl chloride, ethylene chloride, trichloroethane, tetrachloroethane, pentachloroethane, propylene, propane, n-propyl chloride, i-propyl chloride, propylene chloride, trichloropropanes, tetrachloropropanes and pentachloropropanes containing from 1 to 7 chlorine atoms in the molecule, etc. Aliphatic hydrocarbons and aliphatic chlorohydrocarbons containing from 4 to 5 carbon atoms in the molecule, e. g. butane, butylene, chlorobutanes, amylene, pentane and chloropentanes etc., may also be perchlorinated to produce carbon tetrachloride by the method herein disclosed, but not as satisfactorily as the aliphatic hydrocarbons and chlorohydrocarbons containing from 2 to 3 carbon atoms in the molecule. Chloroolefines containing from two to five carbon atoms in the molecule may also be used as starting materials, but such compounds are, of themselves, valuable products, and, except for their possible presence in materials recycled in the process, they seldom are used for the production of carbon tetrachloride. In practice, compounds having the above general formula $C_nHX_{n'}Y_{n''}$ and containing two or three carbon atoms in the molecule are preferred as starting materials in producing carbon tetrachloride by the present process.

A gaseous mixture of the above-mentioned starting materials in the proportions just stated is fed in continuous flow into a reaction chamber where it is heated to a reaction temperature above 500° C., advantageously from 500° to 900° C., and preferably between 500° and 800° C. Once the reaction is started, it may usually be continued without further supply of heat from an outside source, in which case heat generated by the reaction is relied upon to maintain the reaction chamber temperature. In some instances, it is desirable that the reaction chamber be externally cooled, e. g. with water or steam, etc., so as to avoid the development of an excessively high reaction temperature with resultant carbonization of the materials under treatment. The rate of vapor feed is such as to sustain the reaction "flame" and maintain it within the reactor. The reaction is preferably carried out in an unpacked reaction chamber, but it may, if desired, be accomplished by passage of the reaction mixture into a bath of fused metal chlorides or into a chamber which is packed with a granular material such as cole, charcoal, or pumice, etc. The presence of such contact materials in the reaction zone sometimes aids in obtaining substantially uniform heating of all portions of the reaction vapors. However, when using tetrachloroethylene or other diluents in the feed mixture sufficiently uniform heating may be obtained in an open reaction chamber without the aid of such contact materials.

The vapors flowing from the reaction chamber are cooled to condense the organic products and the latter are separated, e. g. by fractional distillation. The tetrachloroethylene which is obtained may advantageously be admixed with fresh quantities of chlorine and the aliphatic compound to be perchlorinated and be returned to the reaction. The minor amount of hexachloroethane normally formed in the reaction may, if desired, be recycled together with the tetrachloroethylene. The method permits the continuous chlorination of any of the hereinbefore-mentioned aliphatic hydrocarbons or chlorohydrocarbons to produce carbon tetrachloride in higher yield and with less by-product formation than has heretofore been possible.

The following example describes one way in which the principle of the invention has been applied, but is not to be construed as limiting the invention.

Example

The vapor mixture of propylene, chlorine and tetrachloroethylene was passed in turbulent flow into an open reaction chamber. The vapors were ignited by external heating, but thereafter external heating was discontinued and the reactor was cooled on the outside with water. The heat of the reaction was sufficient to ignite the inflowing vapor mixture and cause continuance of the reaction. The temperature of vapors flowing from the reaction chamber varied during the reaction, but was in the range of from 500° to 800° C. The effluent vapors were cooled to condense the organic products. The condensate was fractionally distilled to separate the products, particularly the carbon tetrachloride and tetrachloroethylene. Once the reaction was under way, the feed of tetrachloroethylene from an outside source was discontinued and, instead, a mixture of tetrachloroethylene and a minor amount of hexachloroethane was continuously separated from the condensed products and was returned to the reaction in admixture with the feed of chlorine and propylene. Thereafter, the vaporized feed mixture consisted of approximately one molecular equivalent of propylene, 6.93 molecular equivalents of chlorine, 1.4 molecular equivalents of the recycled tetrachloroethylene and 0.098 molecular equivalents of the recycled hexachloroethane. The organic products being condensed from the reacted mixture contained 31.1 per cent by weight of carbon tetrachloride, 64.6 per cent of tetrachloroethylene and 4.3 per cent of higher boiling products, principally hexachloroethane. Expressed in another way, the freshly condensed products contained 1.15 molecular equivalents of carbon tetrachloride and 2.22 molecular equivalents of tetrachloroethylene per mole of propylene in the feed mixture. Since the feed mixture contained 1.4 molecular equivalents of tetrachloroethylene per mole of propylene, there were formed by the reaction 0.82 molecular equivalent of tetrachloroethylene and 1.15 molecular equivalents of carbon tetrachloride per mole of propylene in the feed mixture. The carbon tetrachloride and the excess of tetrachloroethylene over the amount being recycled were continuously withdrawn from the reaction system.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method for the production of carbon tetrachloride, the steps which consist in forming a vapor mixture of an aliphatic compound having the general formula:

$$C_nHX_{n'}Y_{n''}$$

wherein X and Y each represents a member of the group consisting of hydrogen and chlorine, $n$ is an integer of from 2 to 3, and $n'$ and $n''$ are integers having a sum corresponding to one of the values $2n-1$ and $2n+1$, tetrachloroethylene in amount corresponding to from 0.4 to 10 times the molecular equivalent of the aliphatic compound having said general formula, and chlorine in amount at least as great as that theoretically required to perchlorinate the aliphatic compound having said general formula and convert it to carbon tetrachloride, passing the vapor mixture through a reaction zone where it is heated to a reaction temperature between 500° and 900° C., and cooling the vapors flowing from said zone to condense the organic products.

2. In a method for the production of carbon tetrachloride, the steps which consist in forming a mixture of an aliphatic compound having the general formula:

$$C_nHX_{n'}Y_{n''}$$

wherein X and Y each represent a member of the group consisting of hydrogen and chlorine, $n$ is an integer of from 2 to 3, and $n'$ and $n''$ are integers having a sum corresponding to one of the values $2n-1$ and $2n+1$, tetrachloroethylene in amount corresponding to from 0.5 to 3 times the molecular equivalent of the aliphatic compound having said general formula, and chlorine in amount at least as great as that theoretically required to perchlorinate the aliphatic compound having said general formula and convert it to carbon tetrachloride, passing the mixture through a reaction zone where it is heated in vapor phase to a reaction temperature between 500° and 800° C., cooling the vapors flowing from said zone to condense the organic products, distilling carbon tetrachloride from the condensate to leave a residue comprising tetrachloroethylene and returning the tetrachloroethylene to the first of the foregoing steps.

3. A method, as claimed in claim 2, wherein the aliphatic compound subjected to the perchlorination reaction is propylene.

References Cited in the file of this patent

UNITED STATES PATENTS

| | | |
|---|---|---|
| 2,160,574 | Hennig | May 30, 1939 |
| 2,305,821 | Wimmer | Dec. 22, 1942 |
| 2,442,324 | Heitz et al. | May 25, 1948 |
| 2,577,388 | Warren | Dec. 4, 1951 |